(12) United States Patent
Park et al.

(10) Patent No.: US 10,274,022 B2
(45) Date of Patent: Apr. 30, 2019

(54) CLUTCH STRUCTURE

(71) Applicant: HYUNDAI MOTOR COMPANY, Seoul (KR)

(72) Inventors: Jong Yun Park, Hwaseong-si (KR); Kyung Song, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 124 days.

(21) Appl. No.: 15/445,596

(22) Filed: Feb. 28, 2017

(65) Prior Publication Data
US 2018/0142739 A1    May 24, 2018

(30) Foreign Application Priority Data
Nov. 24, 2016    (KR) .......................... 10-2016-0157624

(51) Int. Cl.
  *F16D 23/04*    (2006.01)
  *F16D 23/06*    (2006.01)

(52) U.S. Cl.
  CPC ........ *F16D 23/04* (2013.01); *F16D 2023/065* (2013.01); *F16D 2023/0681* (2013.01)

(58) Field of Classification Search
  None
  See application file for complete search history.

(56) References Cited

U.S. PATENT DOCUMENTS

| | | | | |
|---|---|---|---|---|
| 4,805,755 A | * | 2/1989 | Fukumoto | ............... F16D 23/06 192/53.32 |
| 2016/0201736 A1 | * | 7/2016 | Back | ....................... F16D 23/06 74/325 |
| 2018/0058514 A1 | * | 3/2018 | Christoffer | ............ F16D 23/025 |
| 2018/0058515 A1 | * | 3/2018 | Christoffer | ............ F16D 23/025 |
| 2018/0112720 A1 | * | 4/2018 | Choi | ....................... F16D 13/32 |

FOREIGN PATENT DOCUMENTS

KR    10-2007-0107610 A1    11/2007

* cited by examiner

*Primary Examiner* — Jacob S. Scott
(74) *Attorney, Agent, or Firm* — Brinks Gilson & Lione

(57) ABSTRACT

A clutch structure of a transmission includes: a hub secured to a rotating shaft, a sleeve mounted on the hub so as to slide linearly, a clutch gear to rotate relative to the rotating shaft and integrally formed with a clutch cone, a first friction ring provided between the clutch gear and the hub to be pressed toward the clutch gear, a second friction ring having an inner surface to contact an outer surface of the clutch cone, and a middle cone having an inner surface to contact an outer surface of the second friction ring and an outer surface to contact an inner surface of the first friction ring. Each of the second friction ring and the middle cone is provided with a friction member on at least one of an inner diameter portion and an outer diameter portion each of the second friction ring and the middle cone.

8 Claims, 8 Drawing Sheets

CLUTCH STRUCTURE

CROSS-REFERENCE TO RELATED APPLICATION

This application claims the priority to and the benefit of Korean Patent Application No. 10-2016-0157624, filed on Nov. 24, 2016, which is incorporated herein by reference in its entirety.

FIELD

The present disclosure relates to a clutch structure, and more particularly to a clutch structure that is used for a transmission of a vehicle.

BACKGROUND

The statements in this section merely provide background information related to the present disclosure and may not constitute prior art.

In general, a plurality of clutches is used for a transmission of a vehicle in order to transmit or shut off driving force between rotatable bodies, which rotate relative to each other.

It is desired for the clutch to have an increased torque transmission capacity and a compact size. However, the size of the clutch is typically increased in proportion to increase in torque transmission capacity.

Further, when it is intended to enable the clutch to transmit a relatively large torque, the force for operating the clutch must be increased. Accordingly, the size of a device for operating the clutch, for example, an actuator, is also increased.

The information disclosed in this Background of the present disclosure is only for enhancement of understanding of the general background of the present disclosure and should not be taken as an acknowledgement or any form of suggestion that this information forms the prior art already known to a person skilled in the art.

SUMMARY

The present disclosure addresses the above problems, and provides a clutch structure that is capable of transmitting a relatively large torque with a simple and compact structure and a relatively small volume.

The present disclosure provides a clutch structure in which the operating force of the clutch, which is needed for torque transmission, is decreased, and thus the size and capacity of the actuator relating to the clutch are also reduced so that it is possible to deliver a relatively large torque with the clutch system having relatively small and compact size.

It is another advantage of the present disclosure that the clutch structure improves the durability of the clutch by effectively dispersing heat generated by the clutch.

In one form of the present disclosure, a clutch structure includes: a hub secured to a rotating shaft, a sleeve mounted on an outer peripheral surface of the hub so as to slide linearly, a clutch gear mounted on the rotating shaft so as to rotate relative to the rotating shaft, the clutch gear integrally formed with a clutch cone that protrudes toward the hub while decreasing in an outer diameter of the clutch cone, a first friction ring provided between the clutch gear and the hub and configured to be pressed toward the clutch gear so that frictional force is generated between the clutch cone and the hub and consequently a torque is transferred, a second friction ring configured to be inhibited or prevented from rotating relative to the hub and having an inner surface configured to contact an outer surface of the clutch cone, and a middle cone configured to be inhibited or prevented from rotating relative to the clutch gear, the middle cone having: an inner surface configured to contact an outer surface of the second friction ring, and an outer surface configured to contact an inner surface of the first friction ring. Each of the second friction ring and the middle cone is provided with a friction member on at least one of an inner diameter portion and an outer diameter portion each of the second friction ring and the middle cone.

The first friction ring may be provided with a friction member on an inner diameter portion thereof or the clutch cone may be provided with a friction member on an outer diameter portion thereof.

When the first friction ring is provided with a friction member on the inner diameter portion thereof, each of the middle cone and the second friction ring may be provided with a friction member on an inner diameter portion thereof.

When the clutch cone is provided with a friction member on the outer diameter portion thereof, each of the second friction ring and the middle cone may be provided with a friction member on an outer diameter portion thereof.

Any one of the second friction ring and the middle cone may be provided with friction members on both an inner diameter portion and an outer diameter portion thereof.

When the second friction ring is provided with friction members on both the inner diameter portion and the outer diameter portion thereof, the middle cone may be provided with a friction member on the outer diameter portion thereof.

When the middle cone is provided with friction members on both the inner diameter portion and the outer diameter portion thereof, the second friction ring may be provided with a friction member on the inner diameter portion thereof.

The clutch structure may further include a displacement conversion unit for converting rotational displacement of the first friction ring relative to the hub into a linear displacement of the first friction ring in an axial direction oriented toward the clutch gear.

The displacement conversion unit may include a first slanted surface formed at an end portion of a hub recess formed in the hub to accommodate a sleeve protrusion protruding inwards in a radial direction toward the hub from the sleeve, and a second slanted surface formed at a first ring protrusion of the first friction ring so as to be parallel to the first slanted surface. The first slated surface opposes the first friction ring while a width of the first slanted surface is gradually increased in a circumferential direction of the hub recess.

Further areas of applicability will become apparent from the description provided herein. It should be understood that the description and specific examples are intended for purposes of illustration only and are not intended to limit the scope of the present disclosure.

DRAWINGS

The above and other objects, features and other advantages of the present disclosure will be more clearly understood from the following detailed description taken in conjunction with the accompanying drawings.

In order that the disclosure may be well understood, there will now be described various forms thereof, given by way of example, reference being made to the accompanying drawings, in which.

Figure 1:
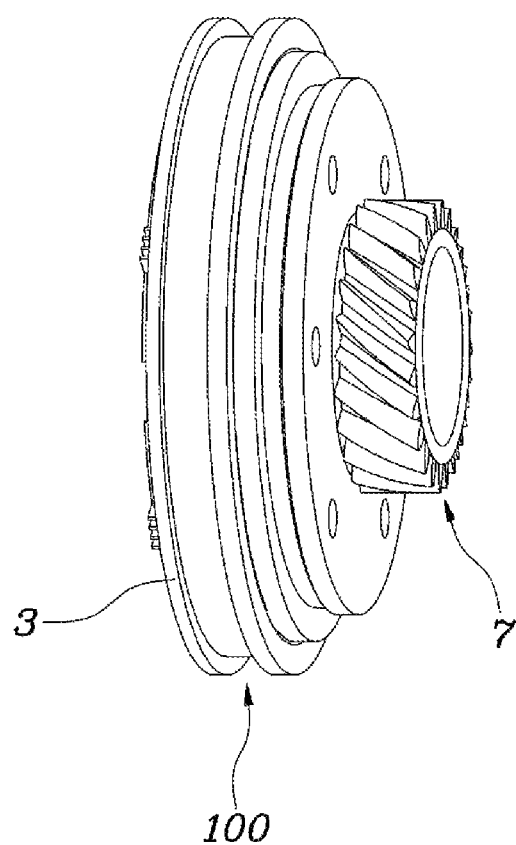
FIG. 1 is a view illustrating an example of a clutch according to the present disclosure.
Figure 2:
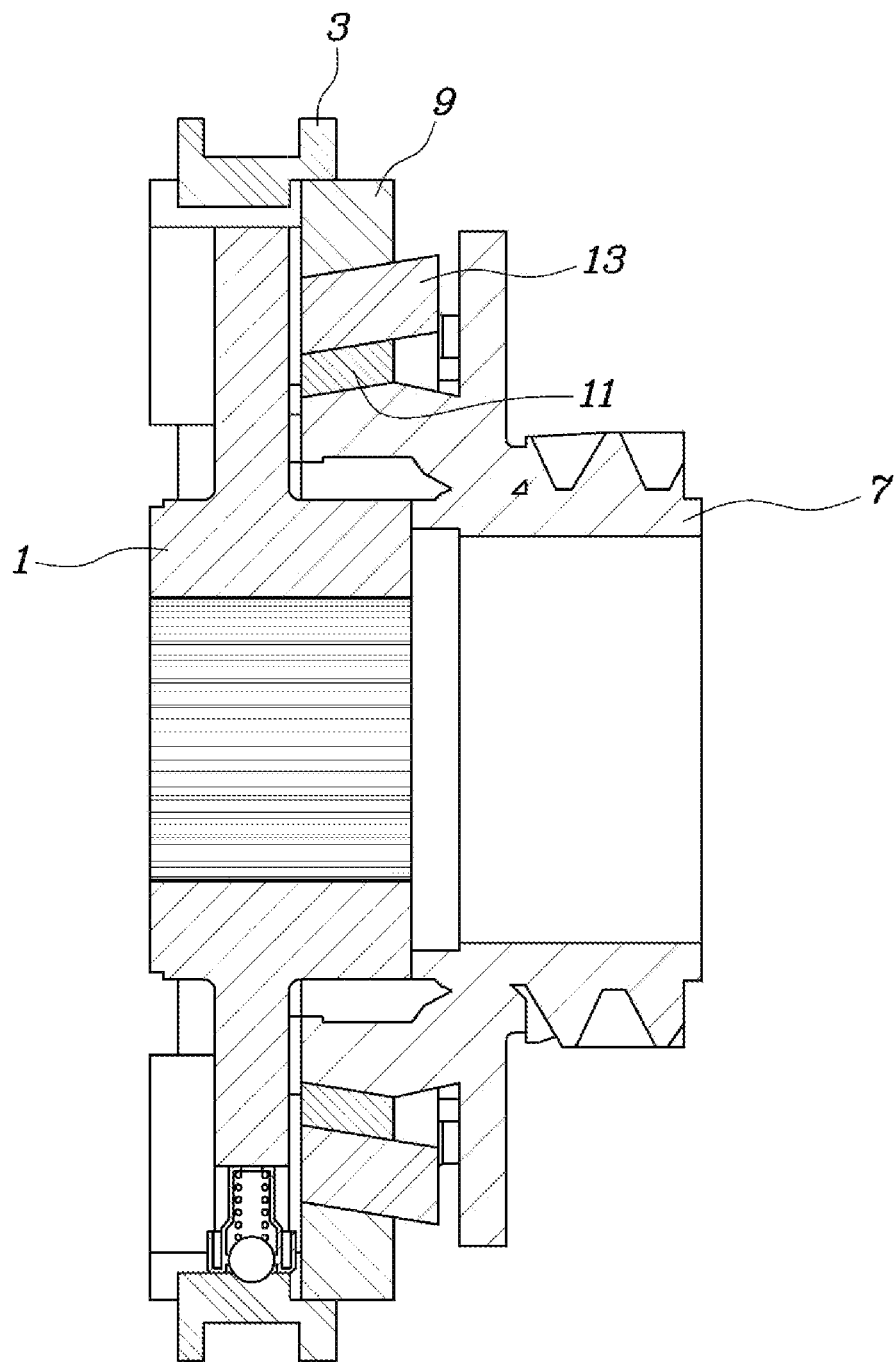
FIG. 2 is a sectional view cut in an axial direction of the clutch depicted in FIG. 1.
Figure 3:
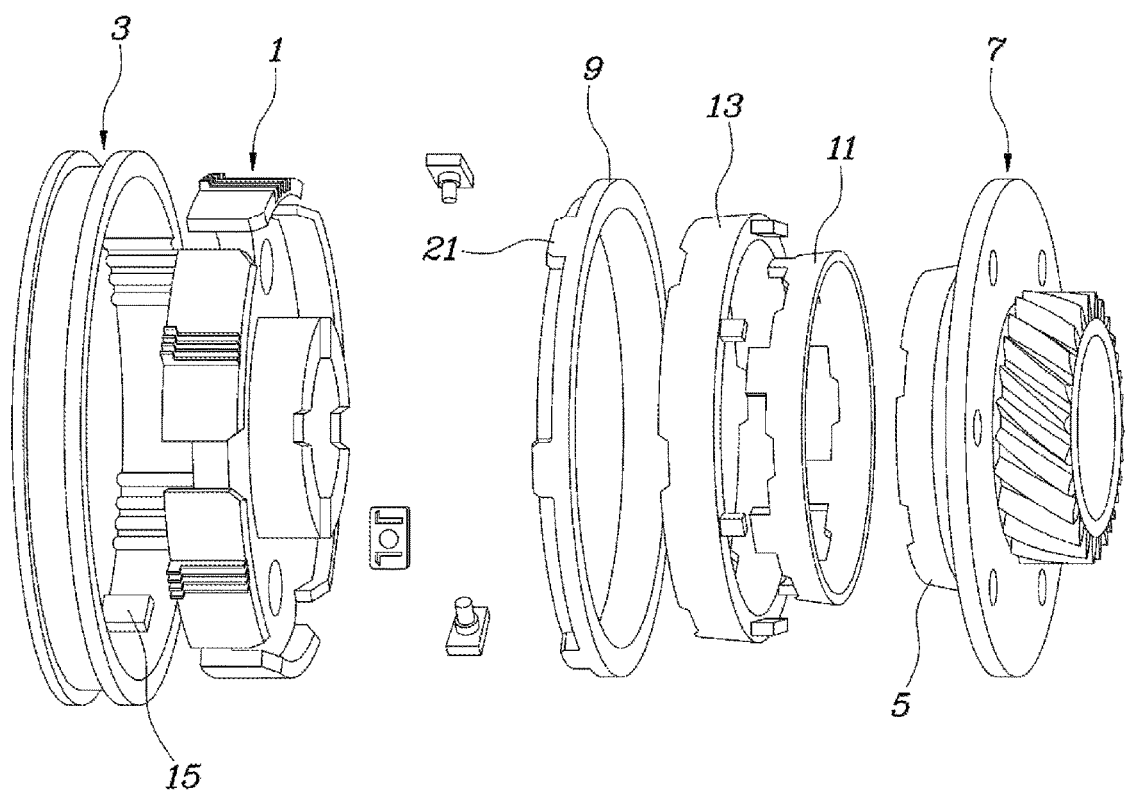
FIG. 3 is an exploded perspective view illustrating the clutch depicted in FIG. 1.
Figure 4:
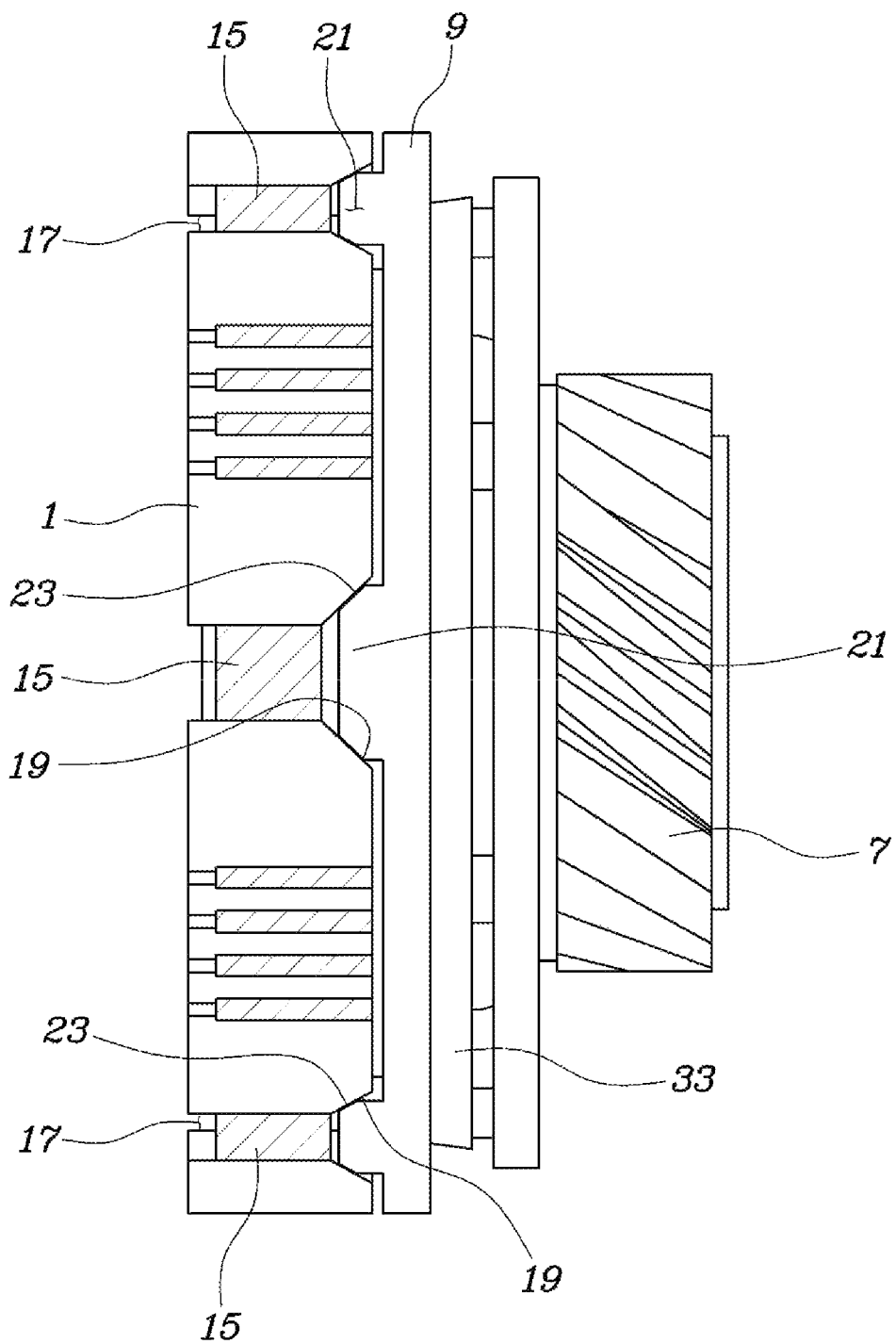
FIG. 4 is a view illustrating the state in which a sleeve, which is located outward of the boundary between the sleeve and a hub, is removed from the clutch depicted in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 4, the structure of a clutch 100 according to the present disclosure comprises: a hub 1 secured to a rotating shaft, a sleeve 3 mounted on the outer peripheral surface of the hub 1 so as to slide linearly, a clutch gear 7 mounted on the rotating shaft so as to rotate relative to the rotating shaft and integrally formed with a clutch cone 5 that protrudes toward the hub 1 while decreasing in outer diameter, a first friction ring 9 provided between the clutch gear 7 and the hub 1 and configured to be pressed toward the clutch gear 7 so that frictional force is generated between the clutch cone 5 and the hub 1 and consequently a torque is transferred, a second friction ring 11 configured to be inhibited or prevented from rotating relative to the hub 1 and having an inner surface configured to contact the outer surface of the clutch cone 5, and a middle cone 13 configured to be inhibited or prevented from rotating relative to the clutch gear 7 and having an inner surface configured to contact the outer surface of the second friction ring 11 and an outer surface configured to contact the inner surface of the first friction ring 9.

Here, the rotating shaft is provided so as to extend through the hub 1 and the clutch gear 7, and the illustration thereof is omitted in the drawings. The axial direction in the present disclosure refers to a longitudinal direction of the rotating shaft, that is, a direction of a central axis of rotation of each of the hub 1 and the clutch gear 7.

In the forms of the present disclosure illustrated in FIGS. 5 to 8, each of the second friction ring 11 and the middle cone 13 is provided with a friction member "Ab" on at least one of the inner diameter portion (i.e., inner surface) and the outer diameter portion (i.e., outer surface) thereof.

Frictional heat is generated at the friction surfaces between the first friction ring 9, the middle cone 13, the second friction ring 11 and the clutch cone 5. The generated heat is primarily transferred toward the opposite component, which is not provided with the friction member "Ab". As described above, as a result of each of the middle cone 13 and the second friction ring 11 being provided with the friction member "Ab" on at least one of the inner diameter portion and the outer diameter portion thereof, heat transfer to the interior of each of the middle cone 13 and the second friction ring 11 from both the inner diameter portion and the outer diameter portion thereof is inhibited or prevented. Thus, it is possible to inhibit or prevent the middle cone 13 or the second friction ring 11 from being damaged by heat.

Figure 5:
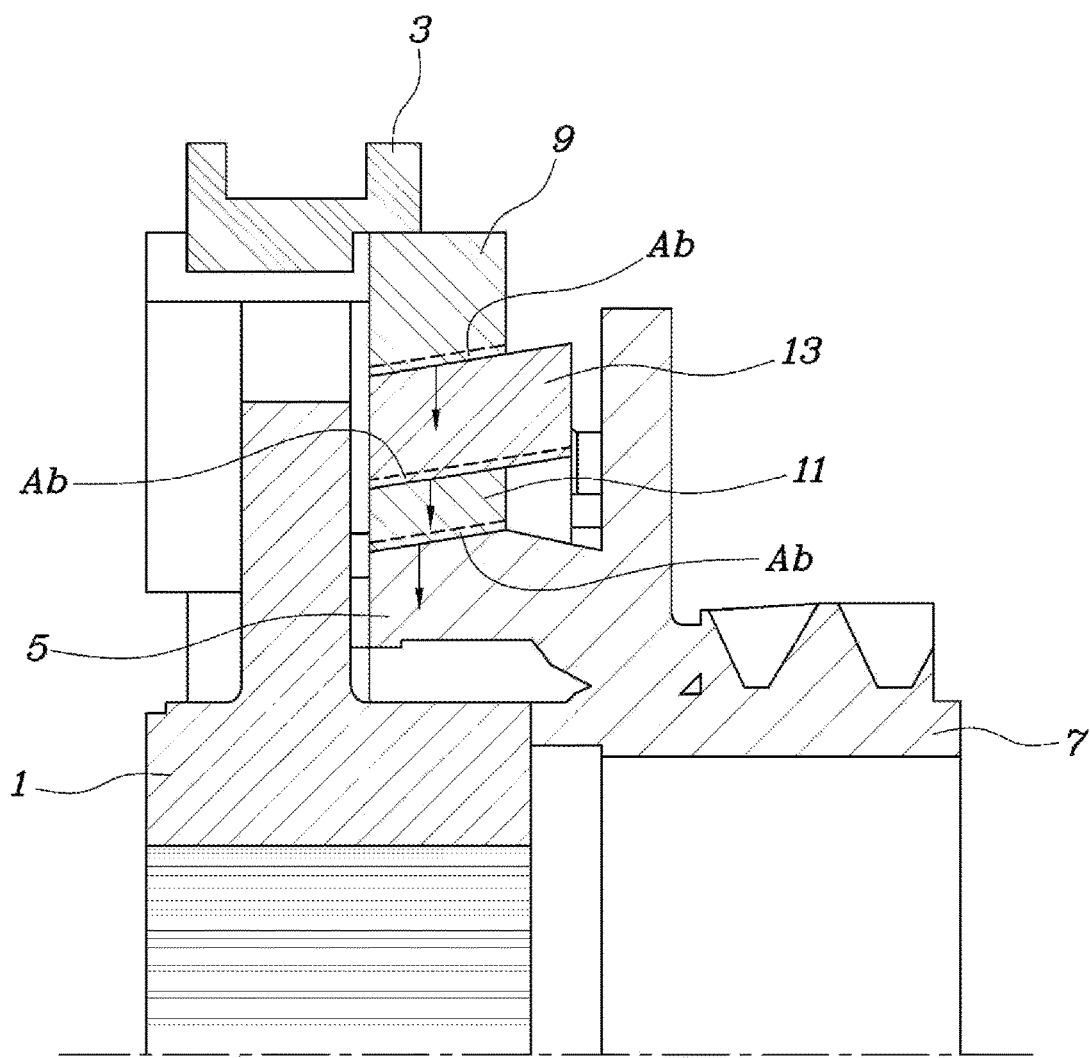
FIG. 5 is a view illustrating a portion in FIG. 2 in detail to explain a first form of the present disclosure.
Figure 6:
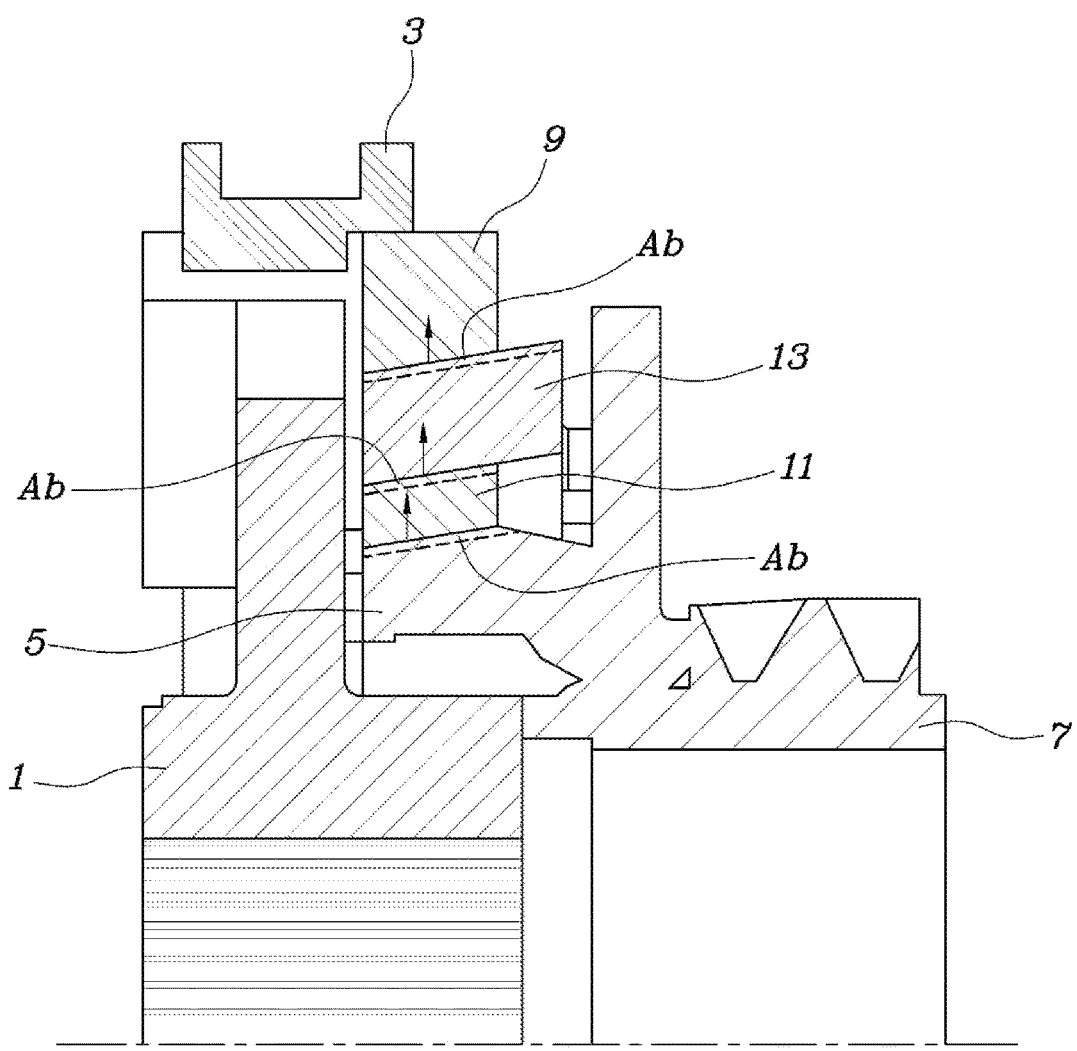
FIG. 6 is a view for explaining a second form of the present disclosure, which corresponds to FIG. 5.

According to the first form illustrated in FIG. 5 and the second form illustrated in FIG. 6, the friction member "Ab" may be provided on either the inner diameter portion of the first friction ring 9 or the outer diameter portion of the clutch cone 5.

The first form illustrated in FIG. 5 shows that the friction member "Ab" is provided on the inner diameter portion of the first friction ring 9. In addition, the friction members "Ab" are provided on the inner diameter portion of the middle cone 13 and the inner diameter portion of the second friction ring 11.

The second form illustrated in FIG. 6 shows that the friction member "Ab" is provided on the outer diameter portion of the clutch cone 5. In addition, the friction members "Ab" are provided on the outer diameter portion of the second friction ring 11 and the outer diameter portion of the middle cone 13.

Figure 7:
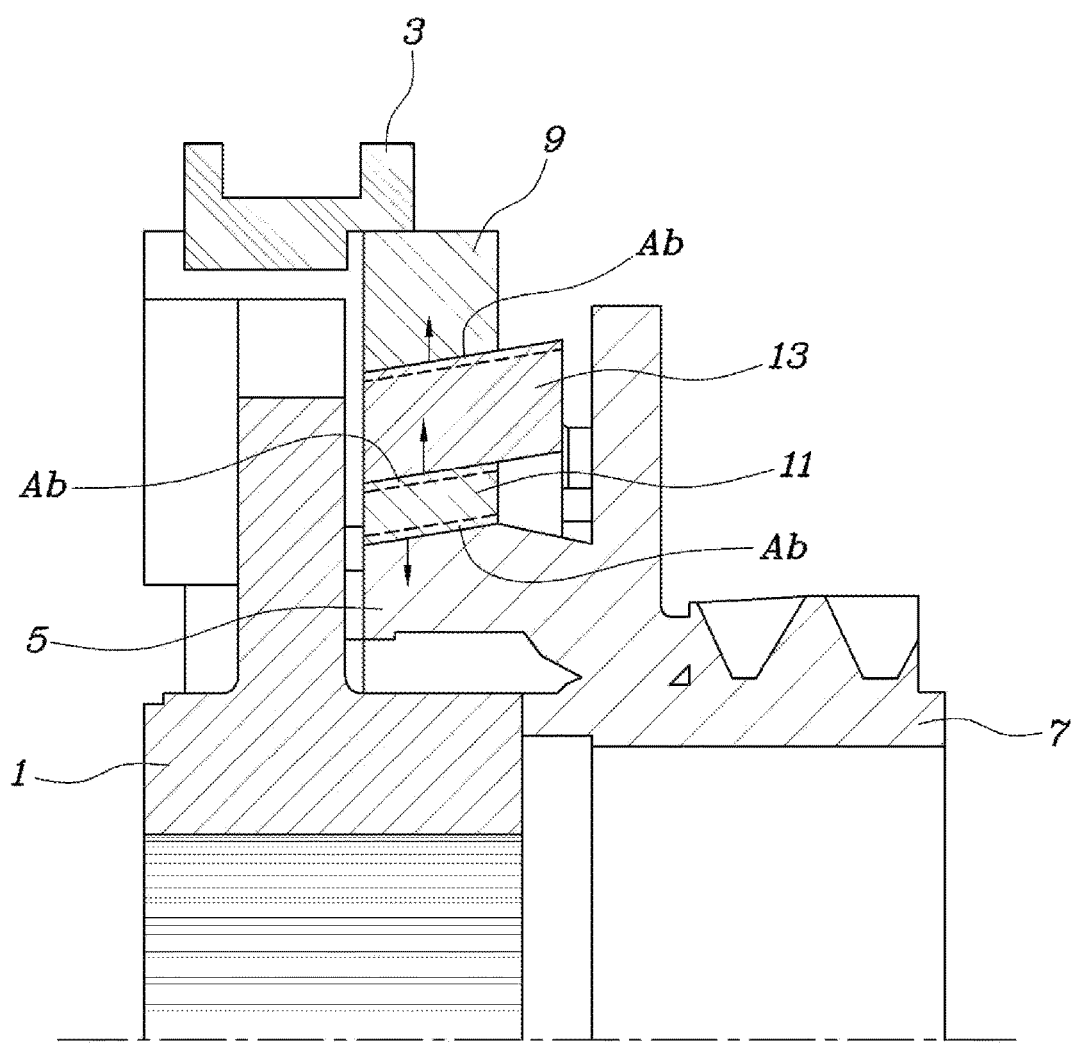
FIG. 7 is a view for explaining a third form of the present disclosure, which corresponds to FIG. 5.
Figure 8:
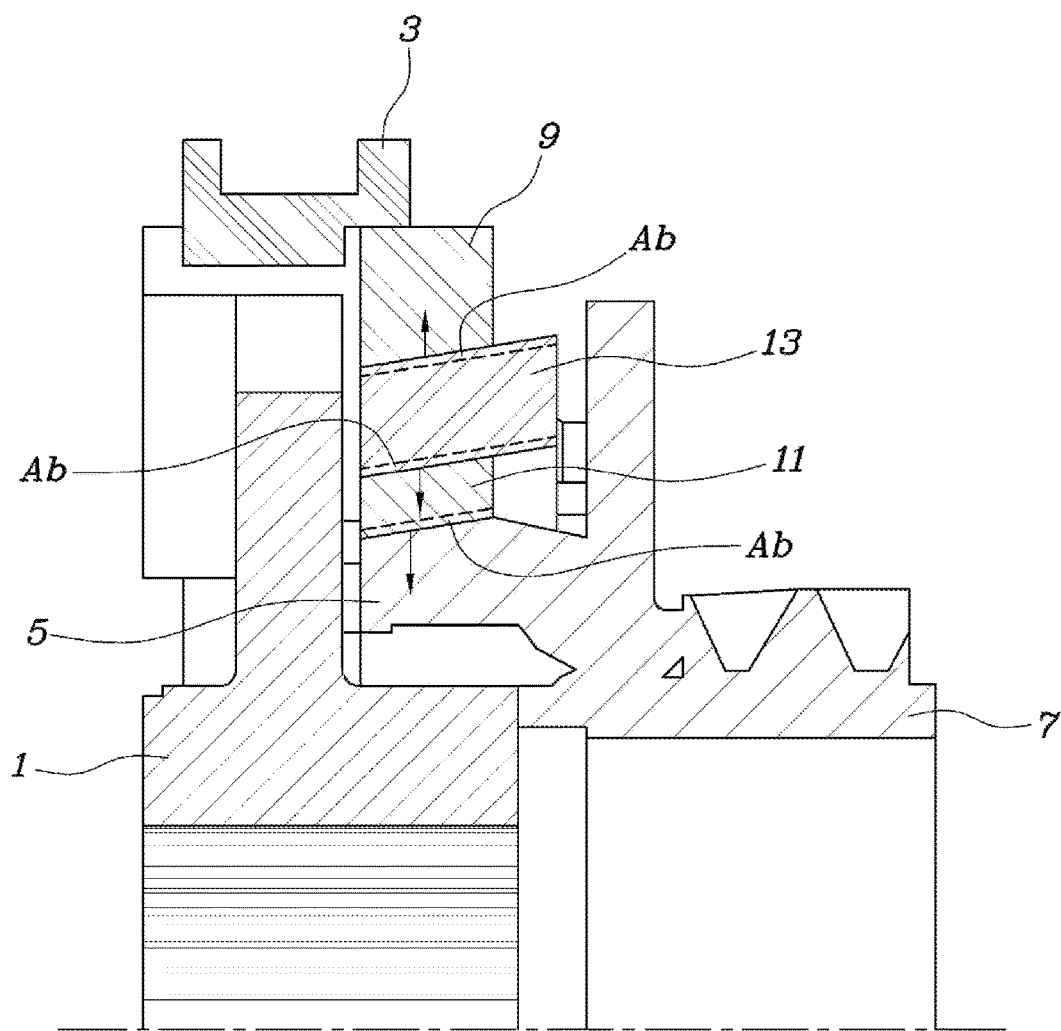
FIG. 8 is a view for explaining a fourth form of the present disclosure, which corresponds to FIG. 5.

According to the third form illustrated in FIG. 7 and the fourth form illustrated in FIG. 8, any one of the second friction ring 11 and the middle cone 13 is provided with the frictional members "Ab" on both the inner diameter portion and the outer diameter portion thereof.

More specifically, FIG. 7 illustrates that the friction members "Ab" are provided on both the inner diameter portion and the outer diameter portion of the second friction ring 11. In addition, the friction member "Ab" is provided on the outer diameter portion of the middle cone 13.

The fourth form illustrated in FIG. 8 shows that the friction members "Ab" are provided on both the inner diameter portion and the outer diameter portion of the middle cone 13. In addition, the friction member "Ab" is provided on the inner diameter portion of the second friction ring 11.

For reference, each of the arrows shown in FIGS. 5 to 8 refers to the direction in which the heat generated at the friction surface is primarily transferred.

According to the above-described forms, both the outer diameter portion and the inner diameter portion of each of the middle cone 13 and the second friction ring 11 are in contact with the other friction components disposed adjacent thereto. Therefore, even when heat is generated at the friction surfaces of the outer diameter portion and the inner diameter portion of each of the middle cone 13 and the second friction ring 11, heat transfer to the interior of each of the middle cone 13 and the second friction ring 11 from both the inner diameter portion and the outer diameter portion thereof is inhibited or prevented due to the aforementioned friction member "Ab", which is provided on at least one of the inner diameter portion and the outer diameter portion thereof. As a result, it is possible to inhibit or prevent heat from being concentrated on a specific component and to inhibit or prevent the durability of the corresponding component from being deteriorated.

For example, in the first form illustrated in FIG. 5, since the friction member "Ab" is provided on the inner diameter portion of the first friction ring 9, the heat generated at the friction surface between the inner diameter portion of the first friction ring 9 and the outer diameter portion of the middle cone 13 is primarily transferred toward the middle cone 13. Further, since the friction member "Ab" is attached to the inner diameter portion of the middle cone 13, the heat generated at the friction surface between the inner diameter portion of the middle cone 13 and the outer diameter portion of the second friction ring 11 is primarily transferred toward the second friction ring 11. Further, since the friction member "Ab" is attached to the inner diameter portion of the second friction ring 11, the heat generated at the friction surface between the inner diameter portion of the second friction ring 11 and the clutch cone 5 is primarily transferred toward the clutch cone 5. Accordingly, any one of the first friction ring 9, the middle cone 13, the second friction ring 11 and the clutch cone 5, which form the friction surfaces between the hub 1 and the clutch gear 7, may not receive frictional heat from both the inner diameter portion and the outer diameter portion of the corresponding component.

Of course, oil is supplied to the first friction ring 9, the middle cone 13, the second friction ring 11 and the clutch cone 5 in order to consistently cool these components. The above-described friction member may be similarly applied to the forms illustrated in FIGS. 6 to 8.

The clutch structure of the present disclosure further comprises a displacement conversion unit, which converts rotational displacement of the first friction ring 9 relative to the hub 1 into linear displacement of the first friction ring 9 in the axial direction oriented toward the clutch gear 7.

The displacement conversion unit includes a first slanted surface 19, which is formed at an end portion of a hub recess 17 formed in the hub 1 to accommodate a sleeve protrusion 15 protruding inwards in the radial direction toward the hub 1 from the sleeve 3. The first slanted surface 19 opposes the first friction ring 9 while the width of the first slanted surface 19 is gradually increased in the circumferential direction of the hub recess 17, and a second slanted surface 23, which is formed at a first ring protrusion 21 of the first friction ring 9 so as to be parallel to the first slanted surface 19.

When the sleeve protrusion 15 of the sleeve 3 pushes the first ring protrusion 21 of the first friction ring 9, frictional force is generated by the movement of the first friction ring 9 toward the clutch gear 7, and the first friction ring 9 rotates relative to the hub 1 by the frictional force. Subsequently, the second slanted surface 23 of the first ring protrusion 21 comes into contact with the first slanted surface 19 of the hub recess 17. The additionally generated rotational displacement is converted into linear displacement, such that the first friction ring 9 moves in the axial direction toward the clutch gear 7, which causes the first friction ring 9 to be further pressed toward the clutch gear 7. As a result, the frictional force between the hub 1 and the clutch gear 7 is generated not only by the force by which the sleeve 3 pushes the first ring protrusion 21 but also by the linear displacement in the axial direction formed by the first slanted surface 19 and the second slanted surface 23. Accordingly, even though an actuator (not illustrated) having a relatively small capacity, which is used to slide the sleeve 3 linearly, is applied to the clutch 100 of the present disclosure, it is possible to achieve substantially the same torque transmission capacity as in the prior art.

The displacement conversion unit, which is provided at the hub 1 and the first friction ring 9, functions to make it possible to achieve a relatively large torque transmission capacity of the clutch 100 while using an actuator having a relatively small capacity, which is needed to move the sleeve 3 linearly.

As is apparent from the above description, the present disclosure provides a clutch structure that is capable of realizing a relatively large torque transmission capacity with a simple and compact structure and a relatively small volume. Further, since the operating force of the clutch, which is needed for torque transmission, is decreased, the size and capacity of the actuator are also decreased and as a result it is possible to achieve a relatively large torque transmission capacity while decreasing the size of the clutch system. In addition, the durability of the clutch is improved by effectively dispersing heat generated by the clutch.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A clutch structure comprising:
    a hub secured to a rotating shaft;
    a sleeve mounted on an outer peripheral surface of the hub and configured to slide linearly;
    a clutch gear mounted on the rotating shaft and configured to rotate relative to the rotating shaft, the clutch gear integrally formed with a clutch cone that protrudes toward the hub while decreasing in an outer diameter of the clutch cone;
    a first friction ring provided between the clutch gear and the hub, the first friction ring configured to be pressed toward the clutch gear so that frictional force is generated between the clutch cone and the hub and consequently a torque is transferred;
    a second friction ring configured to be inhibited from rotating relative to the hub and having an inner surface configured to contact an outer surface of the clutch cone;
    a middle cone configured to be inhibited from rotating relative to the clutch gear, the middle cone having: an inner surface configured to contact an outer surface of the second friction ring, and an outer surface configured to contact an inner surface of the first friction ring, and
    a displacement conversion unit configured to convert a rotational displacement of the first friction ring relative to the hub into a linear displacement of the first friction ring in an axial direction oriented toward the clutch gear,
    wherein each of the second friction ring and the middle cone is provided with a friction member on at least one of the inner surface or the outer surface each of the second friction ring and the middle cone,
    wherein the displacement conversion unit includes a first slanted surface formed at an end portion of a hub recess formed in the hub and configured to accommodate a sleeve protrusion protruding inwards in a radial direction toward the hub from the sleeve, and a second slanted surface formed at a first ring protrusion of the first friction ring so as to be parallel to the first slanted surface, and
    wherein the first slanted surface is configured to oppose the first friction ring while a width of the first slanted surface is gradually increased in a circumferential direction of the hub recess.

2. The clutch structure according to claim 1, wherein the first friction ring is provided with a friction member on the inner surface thereof or the clutch cone is provided with a friction member on the outer surface thereof.

3. The clutch structure according to claim 2, wherein, when the first friction ring is provided with a friction member on the inner diameter portion thereof, each of the middle cone and the second friction ring is provided with a friction member on an inner diameter portion thereof.

4. The clutch structure according to claim 2, wherein, when the clutch cone is provided with a friction member on the outer diameter portion thereof, each of the second friction ring and the middle cone is provided with a friction member on an outer diameter portion thereof.

5. The clutch structure according to claim 1, wherein any one of the second friction ring and the middle cone is provided with friction members on both an inner diameter portion and an outer diameter portion thereof.

6. The clutch structure according to claim 5, wherein, when the second friction ring is provided with the friction members on both the inner diameter portion and the outer diameter portion thereof, the middle cone is provided with the friction member on the outer diameter portion thereof.

7. The clutch structure according to claim 5, wherein, when the middle cone is provided with the friction members on both the inner diameter portion and the outer diameter portion thereof, the second friction ring is provided with the friction member on the inner diameter portion thereof.

8. The clutch structure according to claim 1, wherein the second friction ring is configured to be prevented from rotating relative to the hub, and wherein the middle cone is configured to be prevented from rotating relative to the clutch gear.

* * * * *